US012688949B2

(12) United States Patent
Miao et al.

(10) Patent No.: US 12,688,949 B2
(45) Date of Patent: Jul. 21, 2026

(54) CABLE STRUCTURE WITH INFORMATION TRANSMISSION AND RISK EARLY WARNING FUNCTIONS AND METHOD OF USING SAME

(71) Applicant: Bestone (Zhejiang) Safety Technology Co., Ltd., Hangzhou City (CN)

(72) Inventors: Hong Miao, Hangzhou City (CN);
Junhuo Hong, Hangzhou City (CN);
Rongrong Dai, Hangzhou City (CN);
Chenchao Hong, Hangzhou City (CN);
Yijia Zhang, Hangzhou City (CN);
Wentao Miao, Hangzhou City (CN)

(73) Assignee: Bestone (Zhejiang) Safety Technology Co., Ltd., Hangzhou City (CN)

( * ) Notice: Subject to any disclaimer, the term of this patent is extended or adjusted under 35 U.S.C. 154(b) by 334 days.

(21) Appl. No.: 18/388,312

(22) Filed: Nov. 9, 2023

(65) Prior Publication Data
US 2025/0069782 A1        Feb. 27, 2025

(30) Foreign Application Priority Data
Aug. 24, 2023      (CN) .......................... 202311079451.4

(51) Int. Cl.
*H01B 7/32*          (2006.01)
*G01D 5/353*         (2006.01)
(Continued)

(52) U.S. Cl.
CPC ............. *H01B 7/328* (2013.01); *G01D 5/353* (2013.01); *H01B 7/2825* (2013.01); *H01B 7/32* (2013.01);
(Continued)

(58) Field of Classification Search
CPC ...... H01B 7/328; H01B 7/2825; H01B 9/003; H01B 9/005; H01B 11/22; H01B 7/32; G01D 5/353
See application file for complete search history.

(56) References Cited

U.S. PATENT DOCUMENTS

| | | | |
|---|---|---|---|
| 6,367,990 B1 * | 4/2002 | Dumitriu ............. | G02B 6/2558 |
| | | | 385/95 |
| 6,504,979 B1 * | 1/2003 | Norris .................. | G02B 6/4494 |
| | | | 385/109 |
| 9,529,170 B2 * | 12/2016 | Sutehall ............... | G02B 6/4433 |

FOREIGN PATENT DOCUMENTS

| | | | |
|---|---|---|---|
| AU | 2019100250 A4 * | 5/2019 | ............. H01B 11/22 |
| CN | 201570316 | 9/2010 | |

OTHER PUBLICATIONS

First Office Action issued May 9, 2024 in corresponding Chinese Patent Application No. 202311079451.4, with English translation.

* cited by examiner

*Primary Examiner* — Uyen Chau N Le
*Assistant Examiner* — Tajanae Nicole Green
(74) *Attorney, Agent, or Firm* — JEEN IP LAW, LLC

(57)            ABSTRACT

The present disclosure provides a cable structure with information transmission and risk early warning functions and a method of using the same. An optical fiber unit includes a communicating optical fiber unit and a sensing optical fiber unit. The communicating optical fiber unit consists of a single-mode optical fiber and a casing for protecting the optical fiber. The sensing optical fiber unit consists of a single-mode optical fiber and/or a multimode optical fiber and a casing for protecting the optical fiber. The optical fiber unit includes a single optical fiber or a plurality of optical fibers. The optical fiber in the communicating optical fiber unit and the optical fiber in the sensing optical fiber unit are (Continued)

packaged separately in separate casings or packaged together in a same casing. The optical fiber unit is placed between an outer sheath and a waterproof insulating layer of the power transmission unit.

6 Claims, 3 Drawing Sheets

(51) Int. Cl.
  *H01B 7/282* (2006.01)
  *H01B 9/00* (2006.01)
  *H01B 11/22* (2006.01)
(52) U.S. Cl.
  CPC ............. *H01B 9/003* (2013.01); *H01B 9/005* (2013.01); *H01B 11/22* (2013.01)

1.1
1.2
1.3
1.4
1.5
1.6
1.7
1.8

2.1
2.2
2.3
2.4
2.5
2.6
2.7
2.8
2.9
2.10
2.11

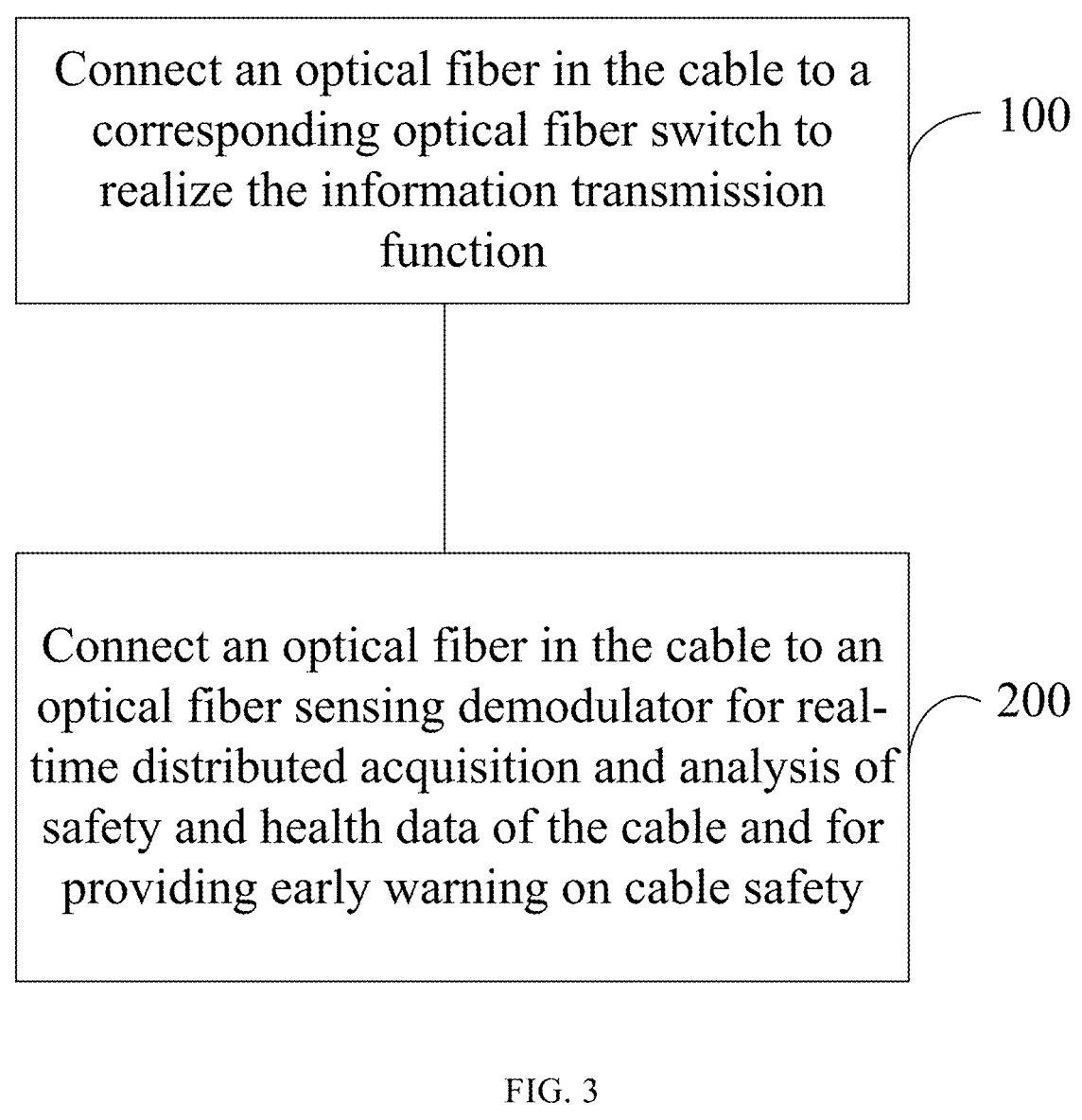

Connect an optical fiber in the cable to a corresponding optical fiber switch to realize the information transmission function ⌐ 100

Connect an optical fiber in the cable to an optical fiber sensing demodulator for real-time distributed acquisition and analysis of safety and health data of the cable and for providing early warning on cable safety ⌐ 200

FIG. 3

CABLE STRUCTURE WITH INFORMATION TRANSMISSION AND RISK EARLY WARNING FUNCTIONS AND METHOD OF USING SAME

CROSS REFERENCE TO RELATED APPLICATION

This patent application claims the benefit and priority of Chinese Patent Application No. 2023110794514, filed with the China National Intellectual Property Administration on Aug. 24, 2023, the disclosure of which is incorporated by reference herein in its entirety as a part of the present application.

TECHNICAL FIELD

The present disclosure relates to the technical field of intelligent manufacturing of cables, and in particular, to a cable structure with information transmission and risk early warning functions and a method of using the same.

BACKGROUND

An existing power transmission unit can transmit only power and cannot transmit information. Safety risks of a cable caused by the quality problem of the cable or man-made damage by construction or geological environmental disasters can also be unpredictable.

SUMMARY

To overcome the shortcomings in the prior art, an objective of the present disclosure is to provide a cable structure with information transmission and risk early warning functions and a method of using the same.

To achieve the above objective, the present disclosure provides the following technical solutions.

A cable structure with information transmission and risk early warning functions includes:

a power transmission unit and an optical fiber unit, where the optical fiber unit includes a communicating optical fiber unit and a sensing optical fiber unit; the communicating optical fiber unit consists of a single-mode optical fiber and a casing for protecting the optical fiber; the sensing optical fiber unit consists of a single-mode optical fiber and/or a multimode optical fiber and a casing for protecting the optical fiber; the optical fiber unit includes a single optical fiber or a plurality of optical fibers; the optical fiber in the communicating optical fiber unit and the optical fiber in the sensing optical fiber unit are packaged separately in separate casings or packaged together in a same casing; the optical fiber unit is placed between an outer sheath and an insulating layer of the power transmission unit; the optical fiber unit is arranged linearly along an axis of the cable; the optical fiber in the communicating optical fiber unit is configured for information transmission; and the optical fiber in the sensing optical fiber unit is configured to acquire risk data of the cable, provide risk early warning, and reduce major safety accidents.

Preferably, the optical fiber unit has an outer diameter in a range of 2.0-6.0 mm and a wall thickness in a range of 0.2-2.0 mm; an optical fiber extra length of the optical fiber unit is greater than a maximum extension length of the cable under an ultimate tension; an optical fiber extra length of the communicating optical fiber unit is 3-6% % greater than a cable core length of the power transmission unit, and the optical fiber extra length of the sensing optical fiber unit is 1-8% % greater than the cable core length of the power transmission unit; optical fibers having different extra lengths are placed in a same casing or in different casings; and extra lengths of optical fibers in a same casing are identical or different at a same grade.

Preferably, after crimping of a copper conductor of the cable is completed and the waterproof insulating layer and the outer sheath of the power transmission unit are repaired, the optical fiber unit is; a water blocking fiber paste or a dry-type water blocking powder is injected between the casing and the single-mode optical fiber as well as the multimode optical fiber; an optical fiber splice closure is disposed at splices of the single-mode optical fiber and the multimode optical fiber; the casing and an interior of the power transmission unit are tightly wrapped by a heat-shrinkable material; the heat-shrinkable material covers the power transmission unit and the optical fiber unit by a length of greater than 1 m to ensure a sealing property; the naked casing is wound around an outer wall of the power transmission unit by using the heat-shrinkable material; and the optical fiber splice closure is sealed by the heat-shrinkable material.

Preferably, a bending radius of the optical fiber unit is not less than 30 times an outer diameter of the optical fiber unit.

A method of using the cable structure with information transmission and risk early warning functions includes:

connecting a communicating optical fiber in the cable to a corresponding optical fiber switch to realize the information transmission function; and connecting a sensing optical fiber in the cable to an optical fiber sensing demodulator for real-time distributed acquisition and analysis of safety and health data of the cable, thereby providing early warning on cable safety.

According to specific embodiments provided in the present disclosure, the present disclosure has the following technical effects:

The present disclosure provides a cable structure with information transmission and risk early warning functions and a method of using the same. The structure includes: the power transmission unit and the optical fiber unit. The optical fiber unit includes a casing, and the plurality of single-mode optical fibers and the multimode optical fiber placed into the casing. The optical fiber unit is provided within the power transmission unit by the heat shrinkage technique. The single-mode optical fibers and the multimode optical fibers are configured for information transmission and risk early warning. The present disclosure incorporates the optical fiber unit with the communication function and the sensing function into a high-strength cable and can increase a communication range, thereby providing fault risk early warning in advance, and improving the safety of the optical fiber unit.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

FIG. 3 is a flowchart of a use method provided in an embodiment of the present disclosure.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments derived from the embodiments in the present disclosure by those skilled in the art without creative efforts shall fall within the protection scope of the present disclosure.

In order to make the above objective, features, and advantages of the present disclosure clearer and more comprehensible, the present disclosure will be further described in detail below in combination with accompanying drawings and particular implementation modes.

Figures 1, 2:
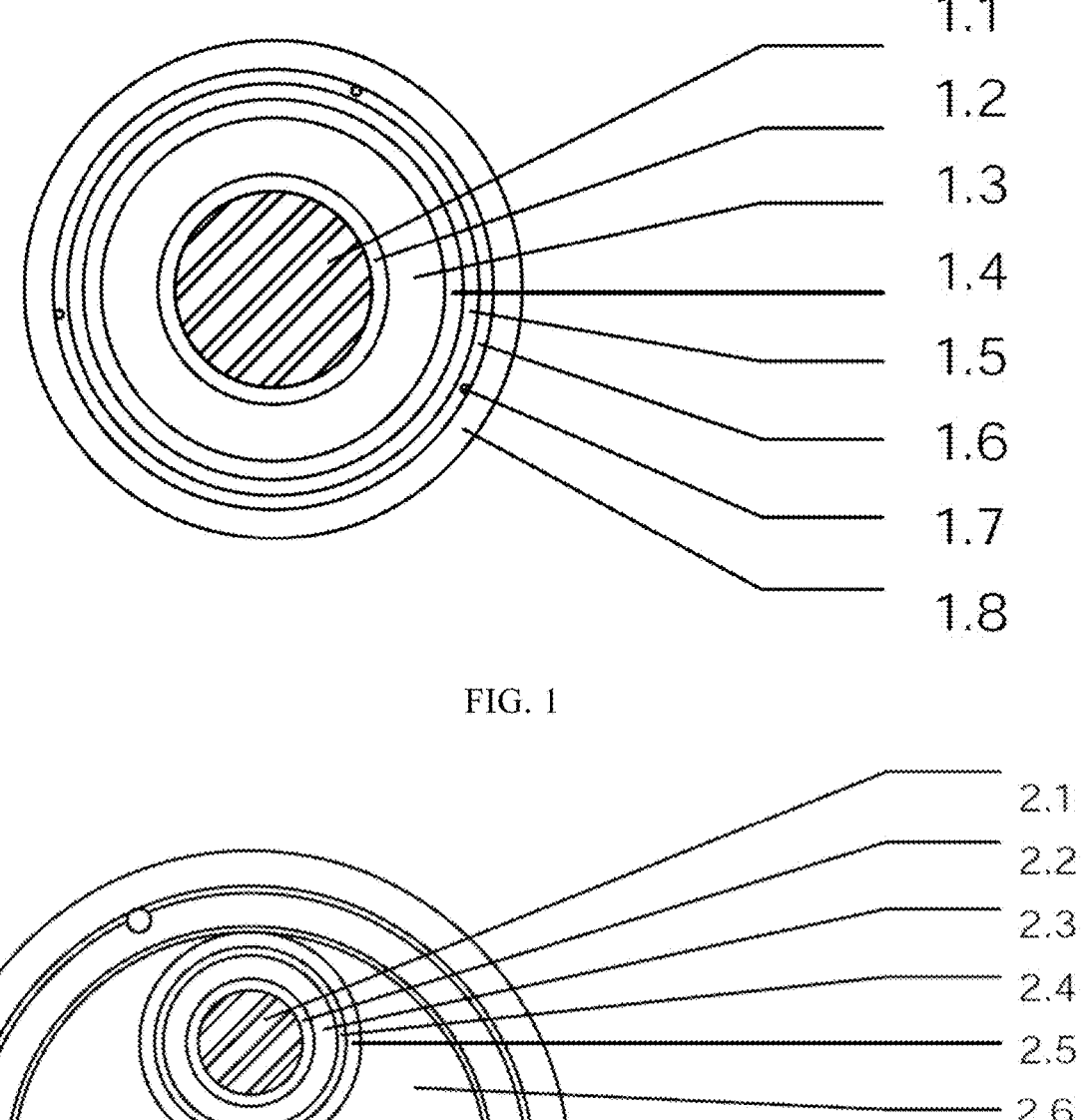
FIG. 1 is a structural diagram of a single-core cable with transmission and sensing functions provided in an embodiment of the present disclosure.
FIG. 2 is a structural diagram of a three-core cable with transmission and sensing functions provided in an embodiment of the present disclosure.
Figure 4:
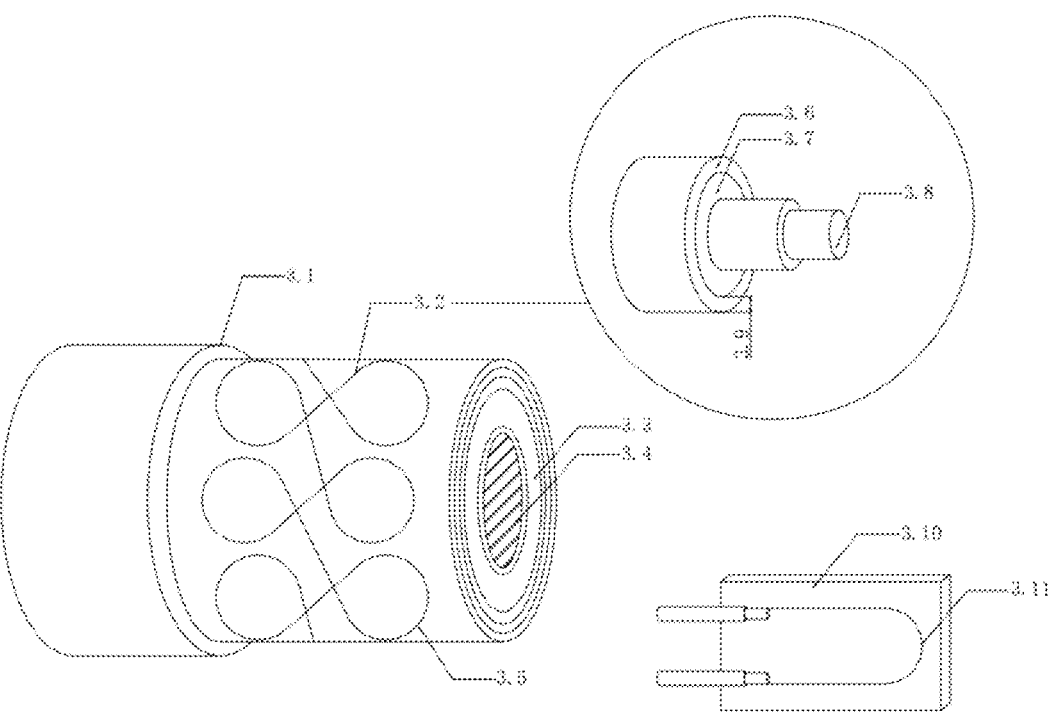
FIG. 4 is a detailed display of the cable structure of the present disclosure.

A single-core cable structure with transmission and sensing functions is as shown in FIG. 1, and includes in sequence from inside to outside: a conductor 1.1, a conductor shield 1.2, an insulator 1.3, an insulation shield 1.4, a copper tape shield 1.5, a wrapping tape 1.6, and an outer sheath 1.8. An optical fiber unit 1.7 is disposed between the conductor 1.1 and the outer sheath 1.8.

A three-core cable structure with transmission and sensing functions is as shown in FIG. 2, and includes: a conductor 2.1, a conductor shield 2.2, an insulator 2.3, an insulation shield 2.4, a copper tape shield 2.5, a filler 2.6, a wrapping tape 2.7, an inner sheath 2.8, an optical fiber unit 2.9, a steel tape armor 2.10, and an outer sheath 2.11.

The cable structure details are shown in FIG. 3, which includes: an outer wall 3.1 of the outer sheath of the r cable, a fiber optic unit 3.2, a waterproof insulating layer 3.3, a steel conductor 3.4, and the fiber optic unit is in 8-shaped winding 3.5. The fiber optic unit 3.2 includes exposed casing 3.6, water blocking fiber paste or a dry-type water blocking powder 3.7, fiber optic 3.8, and a wall thickness of 3.9 for the fiber optic unit; a joint 3.11 of the fiber optic unit fusion splicing, and an optical fiber splice closure 3.10 is installed at the joint.

In a production process of the power transmission unit, a non-metallic optical fiber unit with communication and sensing functions is added between a lead sheath or a shielding waterproof layer and an outermost insulating sheath of a single-core power transmission unit or between insulating waterproof filler materials in gaps between three cables of a three-core high-voltage cable (the optical fibers of two functions may be incorporated into one optical fiber unit or may be separated. The optical fiber unit includes a plurality of single-mode optical fibers and a multimode optical fiber of one core and above. If there are many optical fiber cores, the optical fibers may be divided into a plurality of optical fiber units, thereby facilitating abutting of the optical fibers with different functions. The single-mode optical fibers and the multimode optical fiber may be in one casing or a plurality of casings), so that strong current and weak current can be separated.

Specifically, a single optical fiber unit has an outer diameter of 2.5-6.0 mm and a wall thickness of 0.2-2.0 mm. With the non-metallic optical fiber unit, various troubles caused by an induced current can be completely eradicated. An extra length of the optical fiber unit in the cable needs to be greater than a maximum extension length of the cable under an ultimate tension, thereby guaranteeing that the optical fibers are not broken during production, transportation, installation, and use of the cable. For the convenience of monitoring different stresses on the cable, it is necessary to design one or more optical fiber units composed of a plurality of optical fibers of different extra-length grades.

The length of the optical fiber unit in the cable should be greater than the length of the cable core by more than 4 m (the optical fiber unit needs to be reserved by more than 2 m at two ends of the cable). After the crimping of the cable core is completed and the waterproof insulating layer of the cable is repaired, the optical fiber unit is welded. A low smoke zero halogen ultraviolet corrosion resistant soft plastic casing having an inner diameter not slightly greater than the outer diameter of the optical fiber unit is used to protect the optical fiber unit. A water blocking fiber paste or a dry-type water blocking powder is injected between the plastic casing and the optical fiber unit. To guarantee the sealing effect, the seal section is not allowed to have a gap and a bubble and has a length of greater than 20 mm. Moreover, an optical fiber splice closure is used to protect an optical fiber splice, and sealing between the protective casing of the optical fiber and an inlet/outlet buckle of the splice closure is made. When the splice closure is installed, sealing needs to be made in strict accordance with construction specifications and guarantees that the performance meets the standards. The optical fiber unit with the casing is straightened and tightly fits the cable. The optical fiber unit with the heat-shrinkable casing and the cable body are tightly wrapped in a heat-shrinkable material. The heat-shrinkable material covers the cable and the optical fiber unit by a length of greater than 1 m to ensure the sealing property. The naked casing is then wound around an outer wall of the cable by using the heat-shrinkable material. The optical fiber unit may surround a surface of the cable or may fit the surface of the cable in parallel. Regardless of the fixation method, it is required that the bending radius is not less than 30 times an outer diameter of the casing of the optical fiber unit. Finally, the splice closure and the protective casing are well sealed by using the heat-shrinkable material.

Corresponding to the above method, an embodiment provides a method of using the cable structure with information transmission and risk early warning functions, including:

Step 100: an optical fiber in the cable is connected to a corresponding optical fiber switch to realize the information transmission function.

Step 200: an optical fiber in the cable is connected to an optical fiber sensing demodulator for real-time distributed acquisition and analysis of safety and health data of the cable, thereby providing early warning on cable safety.

During construction, the optical fiber may be connected to the corresponding optical fiber switch to realize the information transmission function, helping an owner with establishing an optical fiber local area network and meeting requirements of the owner for the optical fibers with respect to communication, office, scheduling, and automatic control. The sensing optical fiber in the cable is connected to the optical fiber sensing demodulator for real-time distributed acquisition and analysis of safety and health data of the cable, thereby providing early warning on cable safety, facilitating immediate handling, avoiding and reducing major safety accidents caused by cable destruction by third party construction, loose cable joints, and sheath damage induced insulation decrease, and reducing the owner's loss.

The present disclosure is capable of early warning on cable breakdown or fire by monitoring an abnormal temperature increase caused by loose cable joints or insulation decrease induced by damage to the outer sheath or the waterproof layer of the cable, early warning on cable damage (which may affect the safety of the cable structure) caused by third party construction or abnormal vibration by monitoring the abnormal vibration of the cable, and monitoring cable damage caused by geological disasters and abnormal stresses on the cable during construction and operation by monitoring the strain deformation of the cable.

The present disclosure has the following beneficial effects:

The present disclosure has significant social value. The cable is allowed to have the information transmission function. The communicating optical fiber can be laid where the cable is laid. Not only can an autonomous communication scheduling and automatic control network be established for the power system, but also a cable risk monitoring early warning network can be established synchronously to prevent major safety accidents.

The present disclosure further has significant economic benefits: the composite cable is significant for the establishment of digital China and for power grid intellectualization. The optical fiber unit is arranged in the cable, and the cable can well protect the optical fiber, which in turn provides risk early warning for the cable, thus guaranteeing the personal and property safety of people and the safety of the power grid to a large extent. The traditional cable and the optical fiber unit are constructed through one step rather than constructed separately, and the construction cost is greatly saved. Meanwhile, the expensive pipe hole resources of a city are greatly reduced. It is significant for energy conservation and environment protection, and carbon emission reduction. Reinforcing elements for the optical fiber unit, steel and aluminum casings, and outer sheath materials can be saved. Thus, the social resources and the capital construction costs can be greatly saved.

The embodiments are described herein in a progressive manner. Each embodiment focuses on the difference from another embodiment, and the same and similar parts between the embodiments may refer to each other.

Specific examples are used herein for illustration of the principles and embodiments of the present disclosure. The description of the foregoing embodiments is used to help illustrate the method of the present disclosure and the core principles thereof. In addition, those skilled in the art can make various modifications in terms of specific embodiments and scope of application in accordance with the teachings of the present disclosure. In conclusion, the contents of the present description shall not be construed as limitations on the present disclosure.

What is claimed is:

1. A cable structure with information transmission and risk early warning functions, comprising:
   a power transmission unit and an optical fiber unit, wherein the optical fiber unit comprises a communicating optical fiber unit and a sensing optical fiber unit; the communicating optical fiber unit consists of a single-mode optical fiber and a casing for protecting the optical fiber; the sensing optical fiber unit consists of a single-mode optical fiber and/or a multimode optical fiber and a casing for protecting the optical fiber; the optical fiber unit comprises a plurality of optical fibers; the optical fiber in the communicating optical fiber unit and the optical fiber in the sensing optical fiber unit are packaged separately in separate casings or packaged together in a same casing; the optical fiber unit is placed between an outer sheath and an insulating layer of the power transmission unit; the optical fiber unit is arranged linearly along an axis of a cable; the optical fiber in the communicating optical fiber unit is configured for information transmission; and the optical fiber in the sensing optical fiber unit is configured for risk early warning on the cable and reduction of major safety accidents;
   wherein a bending radius of the optical fiber unit is not less than 30 times an outer diameter of a casing of the optical fiber unit, and the casing of the optical fiber unit is wound around a surface of the cable in an "8" shape.

2. The cable structure with information transmission and risk early warning functions according to claim 1, wherein the optical fiber unit has an outer diameter in a range of 2.5-6.0 mm and a wall thickness in a range of 0.2-2.0 mm; an optical fiber extra length of the optical fiber unit is greater than a maximum extension length of the cable under an ultimate tension; an optical fiber extra length of the communicating optical fiber unit is 3-6% % greater than a cable core length of the power transmission unit, and the optical fiber extra length of the optical fiber unit is 1-8% % greater than the cable core length of the power transmission unit; optical fibers having different extra lengths are placed in a same casing or in different casings; and extra lengths of optical fibers in a same casing are identical or different at a same grade.

3. The cable structure with information transmission and risk early warning functions according to claim 1, wherein a water blocking fiber paste or a dry-type water blocking powder is injected between the casing and the single-mode optical fiber as well as the multimode optical fiber; the casing and the cable are tightly wrapped by a heat-shrinkable material; and the heat-shrinkable material covers the power transmission unit and the optical fiber unit by a length of greater than 1 m.

4. A method of using the cable structure with information transmission and risk early warning functions according to claim 1, comprising:
   connecting an optical fiber in the cable to a corresponding optical fiber switch to realize the information transmission function; and
   connecting an optical fiber in the cable to an optical fiber sensing demodulator for real-time distributed acquisition and analysis of safety and health data of the cable, thereby providing early warning on cable safety.

5. The method according to claim 4, wherein the optical fiber unit has an outer diameter in a range of 2.5-6.0 mm and a wall thickness in a range of 0.2-2.0 mm; an optical fiber extra length of the optical fiber unit is greater than a maximum extension length of the cable under an ultimate tension; an optical fiber extra length of the communicating optical fiber unit is 3-6% % greater than a cable core length of the power transmission unit, and the optical fiber extra length of the optical fiber unit is 1-8% % greater than the cable core length of the power transmission unit; optical fibers having different extra lengths are placed in a same casing or in different casings; and extra lengths of optical fibers in a same casing are identical or different at a same grade.

6. The method according to claim 4, wherein the optical fiber unit is led out from the outer sheath and welded after sealing between the optical fiber unit and the outer sheath is made; a water blocking fiber paste or a dry-type water blocking powder is injected between the casing and the single-mode optical fiber as well as the multimode optical fiber; an optical fiber splice closure is disposed at splices of the single-mode optical fiber and the multimode optical fiber; the casing and the cable are tightly wrapped by a heat-shrinkable material; the heat-shrinkable material covers the power transmission unit and the optical fiber unit by a length of greater than 1 m; the naked casing is wound around an outer wall of the outer sheath of the cable by using the heat-shrinkable material; and the optical fiber splice closure is sealed by the heat-shrinkable material.

\* \* \* \* \*